(12) United States Patent
Dubey

(10) Patent No.: US 11,682,099 B2
(45) Date of Patent: Jun. 20, 2023

(54) HARDWARE ACCELERATOR FOR INTEGRAL IMAGE COMPUTATION

(71) Applicant: Texas Instruments Incorporated, Dallas, TX (US)

(72) Inventor: Aishwarya Dubey, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 106 days.

(21) Appl. No.: 17/462,493

(22) Filed: Aug. 31, 2021

(65) Prior Publication Data

US 2021/0397864 A1 Dec. 23, 2021

Related U.S. Application Data

(63) Continuation of application No. 16/420,152, filed on May 22, 2019, now Pat. No. 11,132,569.

(51) Int. Cl.
| | |
|---|---|
| *G06T 1/20* | (2006.01) |
| *G06T 7/11* | (2017.01) |
| *G06V 10/94* | (2022.01) |
| *G06V 10/50* | (2022.01) |

(52) U.S. Cl.
CPC ............... *G06T 1/20* (2013.01); *G06T 7/11* (2017.01); *G06V 10/50* (2022.01); *G06V 10/94* (2022.01); *G06T 2207/20021* (2013.01)

(58) Field of Classification Search
CPC ... G06T 1/20; G06T 7/11; G06T 2207/20021; G06V 10/50; G06V 10/94
See application file for complete search history.

(56) References Cited

U.S. PATENT DOCUMENTS

| | | |
|---|---|---|
| 9,986,187 B2 | 5/2018 | Meixner |
| 2013/0301930 A1 | 11/2013 | Vigliar et al. |
| 2015/0261702 A1 | 9/2015 | Culurciello et al. |
| 2018/0137600 A1 | 5/2018 | Ha |
| 2018/0189641 A1 | 7/2018 | Boesch et al. |
| 2018/0276784 A1 | 9/2018 | Varadarajan et al. |

FOREIGN PATENT DOCUMENTS

KR 101688435 B1 12/2016

OTHER PUBLICATIONS

Facciolo G et al, Integral Images for Block Matching, Dec. 16, 2014, Image Processing on Line, 4, pp. 344-369. (Year: 2014).*
Maleki S et al, Higher-Order and Tuple-Based Massively-Parallel Prefix Sums, Jun. 13, 2016, PLDI '16, pp. 539-552. (Year: 2016).*
Cruz H et al, Fast Evaluation of Segmentation Quality with Parallel Computing, 2017, Scientific Programming, 2017, pp. 1-9. (Year: 2017).*

(Continued)

*Primary Examiner* — Matthew C Bella
*Assistant Examiner* — Kathleen M Broughton
(74) *Attorney, Agent, or Firm* — Michael T. Gabrik; Frank D Cimino

(57) ABSTRACT

A hardware accelerator for computing integral image values of an image is provided that includes a plurality of row computation components configurable to operate in parallel to compute row sum values of respective rows of a row block of the image. The hardware accelerator is further configured to compute integral image values for the row block using the row sum values and block pivots.

20 Claims, 8 Drawing Sheets

(56) References Cited

OTHER PUBLICATIONS

Ehsan, Shoaib, et al. Integral Images: Efficient Algorithms for their computation and storage in Resource-Sonstrained Embedded Vision Systems, 2015, Semsors, 15, 16804-16830. (Year: 2015).

Marc Moreno Maza, "Parallel Scanning", University of Western Ontario, COMP SCI 4402 Parallel Scanning Notes, London, Ontario, Fall, 2013, pp. 1-29, available at http://www.csd.uwo.ca/-moreno/cs2101_Fall_2013/Darallel_prefix_sum.pdf, last visited May 20, 2019.

B. Muni La Vanya, Parallel Prefix Scan with Compute Unified Device Architecture (CUDA), Proceedings of 9th IRF International Conference, Chennai, India, May 25, 2014, pp. 19-22.

Shoaib Ehsan, et al., "Integral Images: Efficient Algorithms for Their Computation and Storage in Resource-Constrained Embedded Vision Systems", Sensors, 2015, 15:16804-16830, published Jul. 10, 2015, pp. 16804-16829.

* cited by examiner

```
        1  2  3  4    1  2  3  4    1  2  3  4
500 →   5  6  7  8    5  6  7  8    5  6  7  8
        9 10 11 12    9 10 11 12    9 10 11 12

1  2  3  4    1  2  3  4    1  2  3  4
502 →   5  6  7  8    5  6  7  8    5  6  7  8
        9 10 11 12    9 10 11 12    9 10 11 12

1  2  3  4    1  2  3  4    1  2  3  4
504 →   5  6  7  8    5  6  7  8    5  6  7  8
        9 10 11 12    9 10 11 12    9 10 11 12
```

```
1  3  6 10    1  3  6 10    1  3  6 10         10 20 30
5 11 18 26    5 11 18 26    5 11 18 26         26 52 78
9 19 30 42    9 19 30 42    9 19 30 42         42 84 126
```

| | | | | | | | | | | | |
|---|---|---|---|---|---|---|---|---|---|---|---|
| 1 | 3 | 6 | 10 | 11 | 13 | 16 | 20 | 21 | 23 | 26 | 30 |
| 5 | 11 | 18 | 26 | 31 | 37 | 44 | 52 | 57 | 63 | 70 | 78 |
| 9 | 19 | 30 | 42 | 51 | 61 | 72 | 84 | 93 | 103 | 114 | 126 |

| | | | | | | | | | | | |
|---|---|---|---|---|---|---|---|---|---|---|---|
| 1 | 3 | 6 | 10 | 11 | 13 | 16 | 20 | 21 | 23 | 26 | 30 |
| 6 | 14 | 24 | 36 | 42 | 50 | 60 | 72 | 78 | 86 | 96 | 108 |
| 15 | 33 | 54 | 78 | 93 | 111 | 132 | 156 | 171 | 189 | 210 | 234 |

FIG. 9

| | | | | | | | | | | | |
|---|---|---|---|---|---|---|---|---|---|---|---|
| 1 | 3 | 6 | 10 | 1 | 3 | 6 | 10 | 1 | 3 | 6 | 10 |
| 5 | 11 | 18 | 26 | 5 | 11 | 18 | 26 | 5 | 11 | 18 | 26 |
| 9 | 19 | 30 | 42 | 9 | 19 | 30 | 42 | 9 | 19 | 30 | 42 |

FIG. 10

| | | |
|---|---|---|
| 10 | 20 | 30 |
| 26 | 52 | 78 |
| 42 | 84 | 126 |

FIG. 11

| | | | | | | | | | | | |
|---|---|---|---|---|---|---|---|---|---|---|---|
| 1 | 3 | 6 | 10 | 11 | 13 | 16 | 20 | 21 | 23 | 26 | 30 |
| 5 | 11 | 18 | 26 | 31 | 37 | 44 | 52 | 57 | 63 | 70 | 78 |
| 9 | 19 | 30 | 42 | 51 | 61 | 72 | 84 | 93 | 103 | 114 | 126 |

| | | | | | | | | | | | |
|---|---|---|---|---|---|---|---|---|---|---|---|
| 16 | 36 | 60 | 88 | 104 | 124 | 148 | 176 | 192 | 212 | 236 | 264 |
| 21 | 47 | 78 | 114 | 135 | 161 | 192 | 228 | 249 | 275 | 306 | 342 |
| 30 | 66 | 108 | 156 | 186 | 222 | 264 | 312 | 342 | 378 | 420 | 468 |

HARDWARE ACCELERATOR FOR INTEGRAL IMAGE COMPUTATION

This application is a continuation of prior application Ser. No. 16/420,152, filed May 22, 2019, currently pending.

BACKGROUND

An integral image, also referred to as a summed area table, is used in computer vision processing to calculate the sum of pixel values in an image or a rectangular subset thereof. The value at any location (x, y) of an integral image is the sum of the value of the pixel at the location (x, y) in an input image and all of the pixel values to the left and above the pixel in the input image. Once an integral image is computed, finding the sum of pixel values over any rectangular area requires four array references and can be performed at a constant speed regardless of the area size.

An integral image is particularly useful for fast implementation of image pyramids in multi-scale computer vision algorithms as such images are fundamental data structures for feature computation. For example, using an integral image improves the execution speed for computing box filters for feature identification as the integral image eliminates computationally expensive multiplications and allows all box filters regardless of size to be computed at a constant speed.

Although computation of an integral image involves only additions, the total number of operations is significant due to input image size. Thus, the computation of integral images in real-time embedded computer vision systems can adversely impact performance and consume limited hardware resources. Further, using integral images can substantially increase memory size and consume substantial memory bandwidth due to the larger size of the integral image values as compared to the original pixel values, which is also not desirable in embedded computer vision systems.

SUMMARY

Embodiments of the present disclosure relate to methods and apparatus for acceleration of integral image computation. In one aspect, a hardware accelerator for computing integral image values of an image is provided that includes a plurality of row computation components configurable to operate in parallel to compute row sum values of respective rows of a row block of the image.

In one aspect, a method for computing integral image values of an image in a hardware accelerator is provided that includes computing row sum values for each row of a row block of the image, wherein the row sum values for each row are computed in parallel in respective row computation components of the hardware accelerator, computing integral image values for the row block using the row sum values for each row and block pivots from a previous row block of the image, storing a last row of the integral image values as block pivots for computation of integral image values for a next row block of the image, and storing the integral image values for the row block in a memory.

In one aspect, a system on a chip (SOC) is provided that includes a hardware accelerator for computing integral image values of a row block of an image, the hardware accelerator configurable to compute row sum values for each row of the row block in parallel, a memory coupled to the hardware accelerator to store the integral image values, and a processor coupled to the memory and the hardware accelerator, the processor operable to execute a control program comprising software instructions that configure the hardware accelerator to generate the integral image values of the row block.

BRIEF DESCRIPTION OF THE DRAWINGS

FIG. 4 is a simple example illustrating pivotal boundary data used in integral image computation;

FIGS. 5-18 are an example illustrating block based integral image computation using pivotal boundary data;

DETAILED DESCRIPTION

Figure 1:
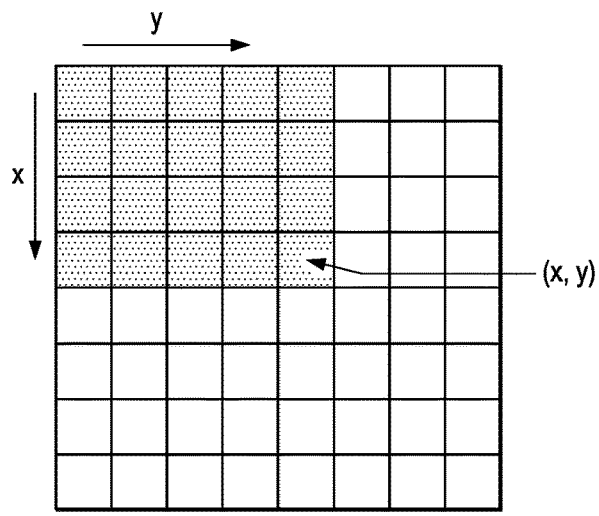
FIG. 1 is a simple example illustrating integral image computation.

Specific embodiments of the disclosure will now be described in detail with reference to the accompanying figures. Like elements in the various figures are denoted by like reference numerals for consistency.

As previously mentioned, the value at any location (x, y) of an integral image is the sum of the value of the pixel at the location (x, y) in the image and all of the pixel values to the left and above the pixel location (x, y) in the image. FIG. 1 is a simple example illustrating the integral image value computation area for a location (x, y) where the "shaded" area covers the image pixel values in the image that are summed to compute the integral image value for the location (x, y). The values of the integral image locations corresponding to locations in an image can be computed using recursively dependent serial computations as per:

$$\text{Row\_Sum}(x, y) = \text{Row\_Sum}(x, y-1) + \text{pixel}(x, y) \quad (1)$$

$$II(x, y) = II(x-1, y) + \text{Row\_Sum}(x, y) \quad (2)$$

where II is the integral image and Row_Sum computes the sum of all the pixels in a row of the image that precede the pixel at location (x, y).

Figure 2:
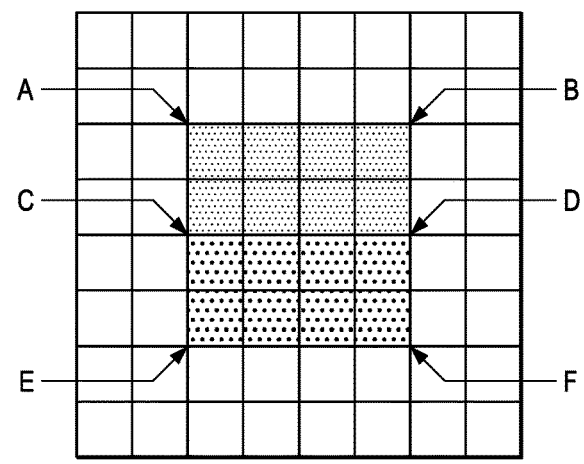
FIG. 2 is a simple example illustrating pixel magnitude computation using integral image values.

Given an integral image, the sum of the pixel values within a rectangular region of the original image can be computed in constant time with four array references regardless of the region size, which is useful for computer vision processing such as feature detection. For example, for feature detection, the difference in total pixel magnitude between two image regions can be computed. Referring to the simple example of FIG. 2, the total pixel magnitudes of the two example regions can be computed as per $$M_{ABCD} = II(A + D - B - C)$$
$$M_{CDEF} = II(C + F - D - E)$$

where A, B, C, D, E, and F are the integral image (II) values at the corners of the regions.

Computing integral images in an embedded computer vision system is both a computation throughput and memory bandwidth challenge. Embodiments of the disclosure provide a hardware accelerator for integral image computation that reduces both the computation time and memory bandwidth needed for computing an integral image.

Figure 3:
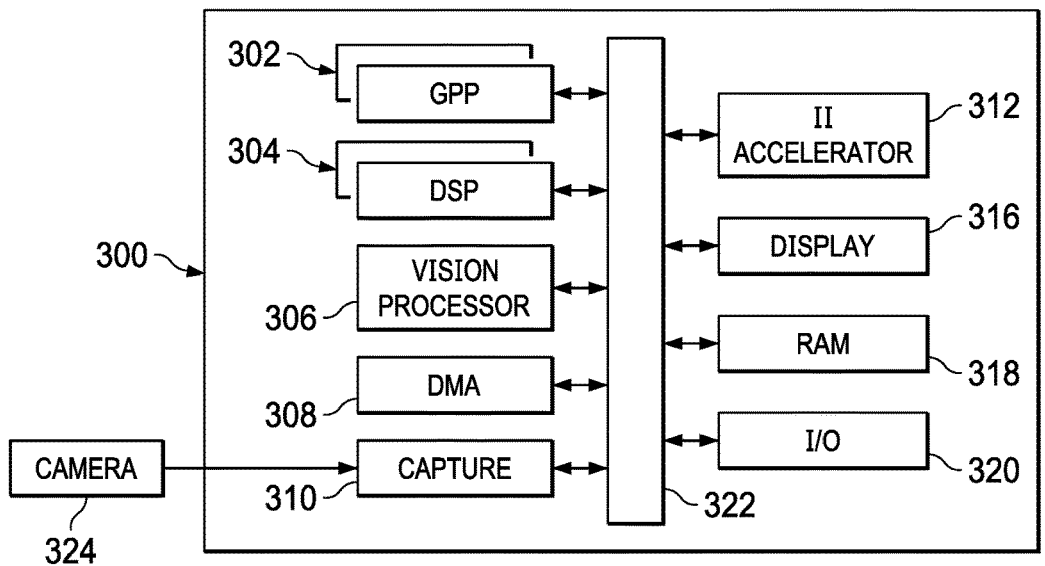
FIG. 3 is a high level block diagram of an example multiprocessor system-on-a-chip (SOC)

FIG. 3 is a high level block diagram of an example multiprocessor system-on-a-chip (SOC) 300 configured to support computer vision processing. The SOC 300 includes dual general purpose processors (GPP) 302, dual digital signal processors (DSP) 304, a vision processor 306, and an integral image (II) accelerator 312 coupled via a high speed interconnect 322.

The vision processor 306 is a vector processor tuned for various computer vision and other signal processing tasks such as features from acceleration test (FAST) feature computation, deep neural convolutional network computations, etc. The GPP 302 hosts the operating system and provides overall control of the operation of the SOC 300. The DSP 304 provides support for computer vision processing such as object detection and classification, which may use the integral images generated using the II accelerator 312.

The SOC 300 further includes a direct memory access (DMA) component 308, a camera capture component 310 coupled to the external camera 324, a display management component 316, on-chip random access (RAM) memory 318, e.g., a computer readable medium, and various input/output (I/O) peripherals 320 all coupled to the processors 302, 304 and the II accelerator 312 via the interconnect 322. The camera 324 may be coupled to the SOC 300 via an analog connection, an Ethernet cable, a low-voltage differential signaling (LVDS) cable, or other suitable wired or wireless connection.

Figure 20:
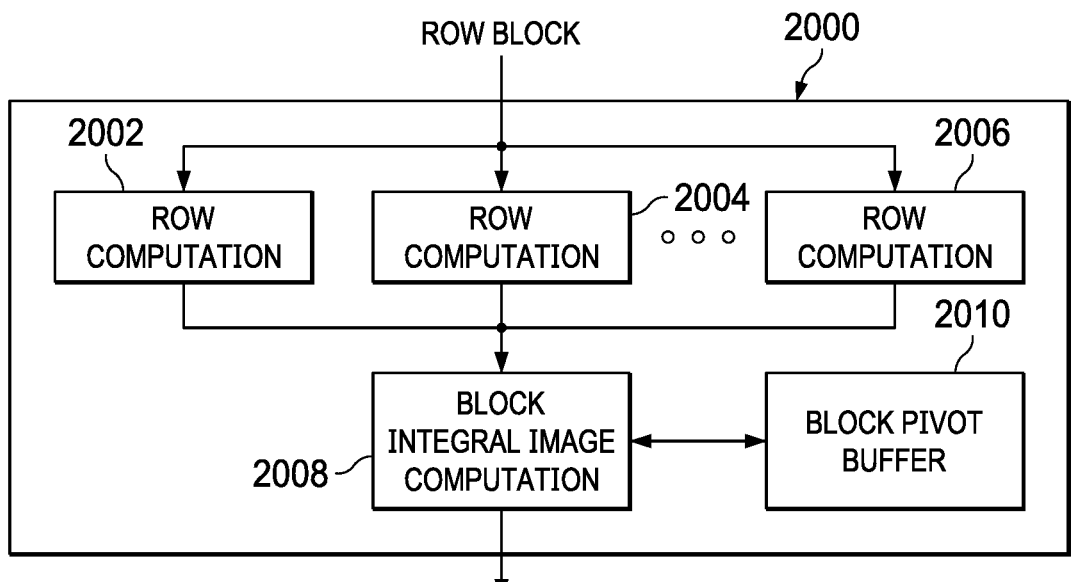
FIG. 20 is a block diagram of an example integral image accelerator of the SOC of FIG. 3.
Figure 21:
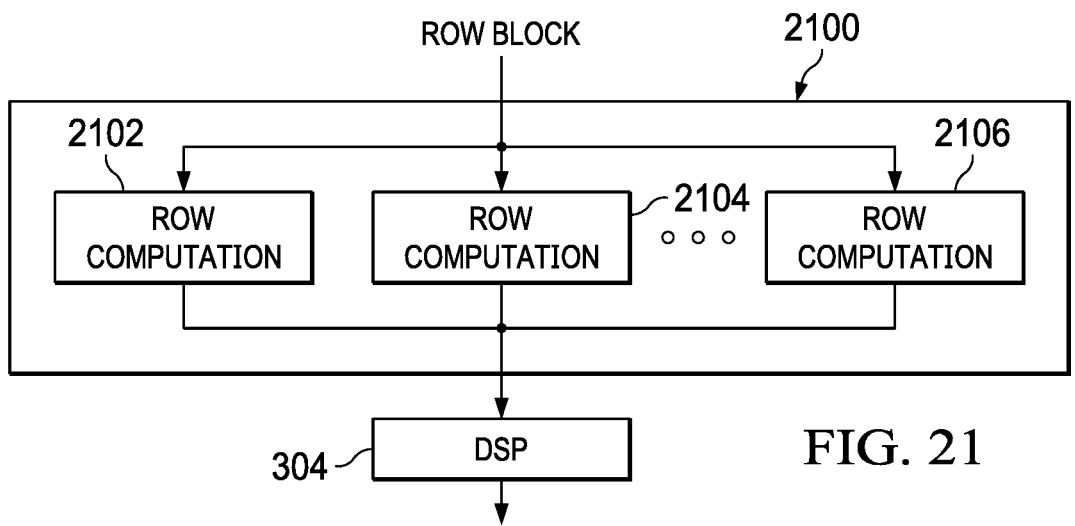
FIG. 21 is a block diagram of an example integral image accelerator of the SOC of FIG. 3.
Figure 22:
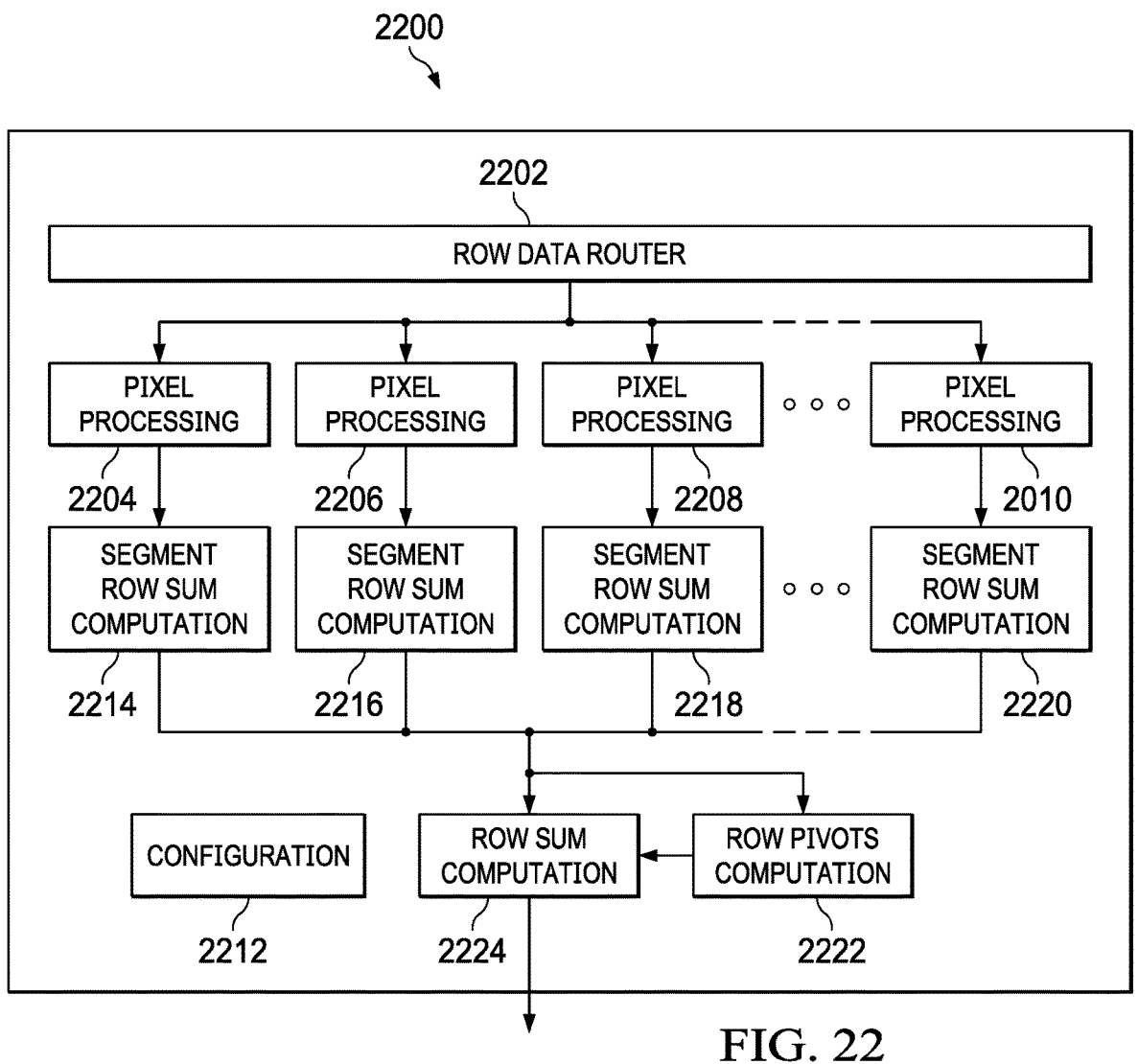
FIG. 22 is a block diagram of an example row sum computation component of the integral image accelerator of FIG. 20 or FIG. 21.

As is explained in more detail in reference to FIGS. 20-22, the II accelerator 312 includes functionality to generate integral image values of row blocks of images captured by the camera 324. A control program executing on the DSP 304 configures the II accelerator 312 responsive to the requirements of a computer vision application to generate integral image values of each row block in an input image in accordance with parameters specified by the application. Parameters of the II accelerator 312 are described in more detail herein. The II accelerator 312 generates integral image values for a row block in accordance with the configured parameters and stores the integral image values in the RAM 318 for use by the application.

The architecture of the II accelerator 312 is based on the following observations regarding the computation of integral image values. One observation is that an image can be divided into smaller blocks for the integral image computation as long as certain pivotal boundary data is shared between adjacent blocks. Consider the simple example of FIG. 4. The example image is divided into four row blocks, i.e., four sets of non-overlapping sequential rows, which are each divided into four non-overlapping blocks. The locations corresponding to pivotal boundary data generated during a row block by row block computation of the integral image are indicated by the "shaded" boxes at the right edges and bottoms of the blocks. The pivotal boundary data items corresponding to the rightmost column of each block are the Row_Sum values (see Eq. 1 above) at the respective boundary locations and are referred to as row pivots herein. The pivotal boundary data items corresponding to the bottom row of each row block are the actual integral image values for the bottom row and are referred to as block pivots herein. Integral image values can be computed for multiple blocks of sequential image rows using row pivots and block pivots.

Figures 4, 5, 6, 7:
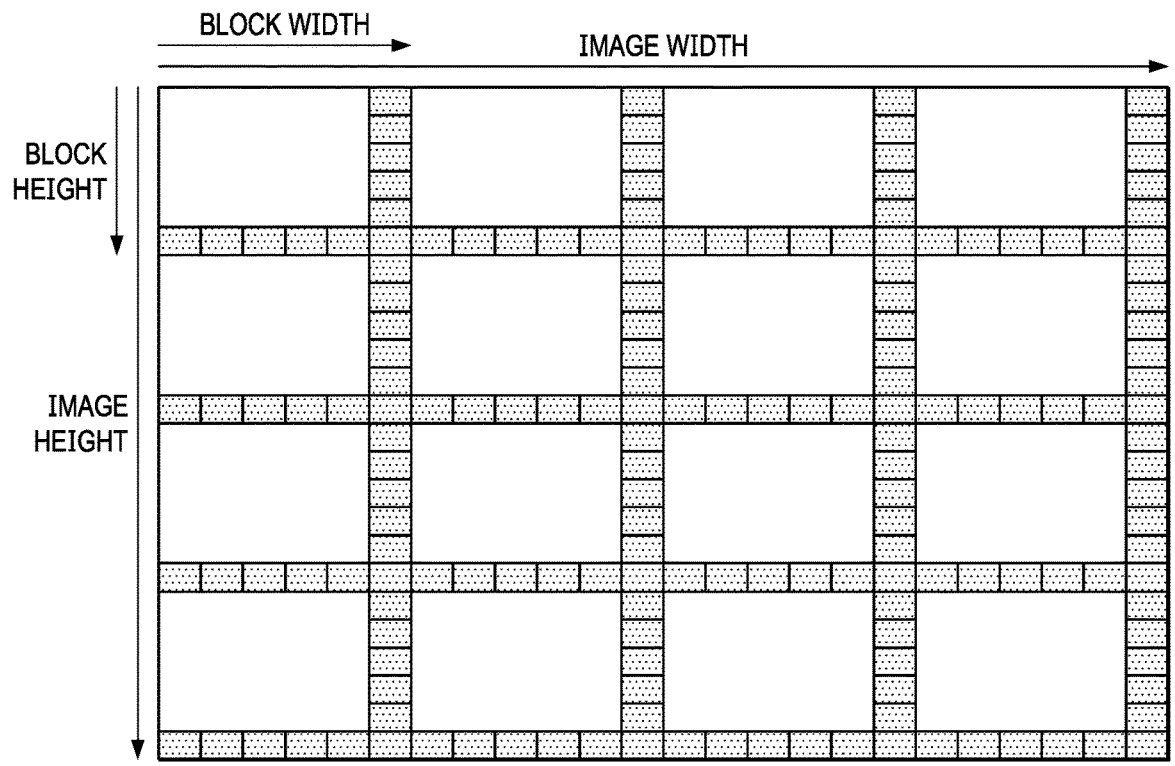

The simple example in FIGS. 5-15 illustrates determination of integral image values using row pivots and block pivots. FIG. 5 shows pixels values for an image with nine rows and twelve columns that is divided into three row blocks 500, 502, 504 of three rows. Each row block is divided into three blocks having three rows and four columns. The pixel values are replicated in each block for simplicity of explanation.

The integral image values corresponding to the top row block 500 are determined as follows. Each row of row block 500 is divided into three row segments of four pixels each and the row sums for the pixel values in each row segment are determined. FIG. 6 shows the results of the row sum determination. Next, the row sum values in each row sum segment are converted to row sum values for the entire respective original row. To accomplish this, row pivots are determined for each row sum segment. A row pivot for a row sum segment is the sum of the row pivots of any preceding row sum segments and the last row sum value in the row sum segment. For example, in the top row of FIG. 6, the row pivot for the first row sum segment is 10 as there are no preceding row sum segments. The row pivot for the middle row sum segment is 20 which is the sum of the last value in the middle row sum segment and the row pivot for the preceding row sum segment. The row pivot for the third row sum segment is 30, which is the sum of the last value in the third row sum segment and the row pivots of the two preceding row sum segments. The row pivots for the other two rows of row sum segments can be similarly determined. FIG. 7 shows the row pivots for each of the row sum segments of FIG. 6.

To convert the row sum values in each row sum segment to row sum values for the entire respective original row, for each row sum segment, the row pivot of the previous row sum segment is added to each value in the row sum segment. For example, in the top row of FIG. 6, the first row sum segment in the top row has no preceding row sum segment, so the values in that row sum segment are the row sum values for the row. For the middle row sum segment, the row pivot value 10 corresponding to the first row sum segment is added to each value in the middle row sum segment to compute the row sum values for the original row corresponding to that row sum segment. For the third row sum segment, the row pivot value 20 corresponding to the middle row sum segment is added to each value in the third row sum segment to compute the row sum values for the original row corresponding to that row sum segment. The row sum values for the corresponding original rows for the other two rows of row sum segments can be similarly computed. FIG. 8 shows the resulting row sum values for the row sum segments of FIG. 6 when the row pivots of FIG. 7 are added in.

Next, the integral image values corresponding to row block 500 are determined. As is shown in the Eq. (2) above, the integral image value of a pixel location (x, y) in an image can be determined by adding the row sum at location (x, y) and the integral image value of the pixel location (x−1, y).

In other words, the integral image value of a pixel location (x, y) can be determined by adding the row sum at location (x, y) to all row sum values in the same column above the location (x, y), i.e., by vertically adding the row sum values. Accordingly, given the row sum values shown in FIG. 8, the integral image value for any location (x, y) in row block 500 can be determined by adding the row sum value at location (x, y) to all row sum values above it in the same column.

Thus, the values in the top row of FIG. 8 are the integral image values as there are no rows above the top row. To determine the integral image values corresponding to the middle row of FIG. 8, each row sum value in the middle row is added to the row sum value in the same column in the top row. To determine the integral image values corresponding to the bottom row of FIG. 8, each row sum value in the bottom row is added to the row sum value in the same column in the middle row and the same column in the top row. FIG. 9 shows the resulting integral image values for row block 502. The integral image values in the bottom row 900 of FIG. 9 are block pivots that are used to determine the integral image values of the next row block 502 of FIG. 5. Note that each block pivot 900 is the sum of the row sums in the corresponding column of row block 500.

The integral image values for the next row block 502 are determined as follows. Each row of row block 502 is divided into three row segments of four pixels each and the row sums for the pixel values in each row segment are determined. FIG. 10 shows the results of the row sum determination. Next, the row sum values in each row sum segment are converted to row sum values for the entire respective original row. To accomplish this, row pivots are determined for each row sum segment. FIG. 11 shows the row pivots for each of the row sum segments of FIG. 10.

To convert the row sum values in each row sum segment to row sum values for the entire respective original row, for each row sum segment, the row pivot of the previous row sum segment is added to each value in the row sum segment. FIG. 12 shows the resulting row sum values for the row sum segments of FIG. 10 when the row pivots of FIG. 11 are added in.

Next, the integral image values corresponding to row block 502 are determined. As previously explained, the integral image value for any location (x, y) in the row block can be determined by adding the row sum value at (x, y) to all row sum values above it in the same column in the image, i.e., by vertically adding the row sum values. Further, each block pivot from the previous row block 500 is the sum of the row sums in the corresponding column of the previous row block 500. Accordingly, given the row sum values shown in FIG. 12, the integral image value for any location (x, y) in row block 502 can be determined by adding the row sum value at location (x, y) to all row sum values above it in the same column in row block 502 and row block 500. Further, because the block pivots 900 from row block 500 are each the sum of the row sums in the corresponding column of row block 500, the integral image value for any location (x, y) in row block 502 can be determined by adding the row sum value at location (x, y) to all row sum values above it in the same column in row block 502 and the block pivot 900 from row block 500 corresponding to the same column.

Thus, to determine the integral image values corresponding to the top row of FIG. 12, each row sum value in the top row is added to the block pivot 900 in the corresponding column. To determine the integral image values corresponding to the middle row of FIG. 12, each row sum value in the middle row is added to the row sum value in the same column in the top row and the block pivot 900 in the corresponding column. To determine the integral image values corresponding to the bottom row of FIG. 12, each row sum value in the bottom row is added to the row sum value in the same column in the middle row and the same column in the top row and the block pivot 900 in the corresponding column. FIG. 13 shows the resulting integral image values for row block 502. The integral image values in the bottom row 1300 of FIG. 13 are block pivots that are used to determine the integral image values the next row block 504 of FIG. 5. Note that each block pivot is the sum of the row sums in the corresponding column of row block 500 and row block 502.

The integral image values for the next row block 504 are determined as follows. Each row of row block 504 is divided into three row segments of four pixels each and the row sums for the pixel values in each row segment are determined. FIG. 14 shows the results of the row sum determination. Next, the row sum values in each row sum segment are converted to row sum values for the entire respective original row. To accomplish this, row pivots are determined for each row sum segment. FIG. 15 shows the row pivots for each of the row sum segments of FIG. 14.

To convert the row sum values in each row sum segment to row sum values for the entire respective original row, for each row sum segment, the row pivot of the previous row sum segment is added to each value in the row sum segment. FIG. 16 shows the resulting row sum values for the row sum segments of FIG. 14 when the row pivots of FIG. 15 are added in.

Next, the integral image values corresponding to row block 504 are determined. As previously explained, the integral image value for any location (x, y) in the row block can be determined by adding the row sum value at (x, y) to all row sum values above it in the same column in the image i.e., by vertically adding the row sum values. Further, each block pivot 1300 from the previous row block 502 is the sum of the row sums in the corresponding column of row block 500 and row block 502. Accordingly, given the row sum values shown in FIG. 16, the integral image value for any location (x, y) in row block 504 can be determined by adding the row sum value at location (x, y) to all row sum values above it in the same column in row block 504, row block 502, and row block 500. Further, because the block pivots 1300 from row block 502 are each the sum of the row sums in the corresponding column of row block 500 and row block 502, the integral image value for any location (x, y) in row block 504 can be determined by adding the row sum value at location (x, y) to all row sum values above it in the same column in row block 504 and the block pivot 1300 from row block 502 corresponding to the same column.

Thus, to determine the integral image values corresponding to the top row of FIG. 16, each row sum value in the top row is added to the block pivot 1300 in the corresponding column. To determine the integral image values corresponding to the middle row of FIG. 16, each row sum value in the middle row is added to the row sum value in the same column in the top row and the block pivot 1300 in the corresponding column. To determine the integral image values corresponding to the bottom row of FIG. 16, each row sum value in the bottom row is added to the row sum value in the same column in the middle row and the same column in the top row and the block pivot 1300 in the corresponding column. FIG. 17 shows the resulting integral image values for row block 504 and FIG. 18 shows the final integral image for the example image.

Another observation is that the row sums of a sequence of n pixel values can be computed in $\log_2 N$ steps of parallel additions, where N=n if n is a power of 2 and N is the closest power of 2 greater than n otherwise. For example, if n=25, then N=32 or if n=16, then N=16. Consider the example of FIG. 19, where n=16 and N=16 and the values are 1-16. The initial step adds pairs of the original values with a stride of 1. That is, each value is added to the immediately preceding value in the set. The arrows illustrate the values contributing to each sum. In the second step, the results of the stride=1 additions are added in pairs with a stride of 2. In the third step, the results of the stride=2 additions are added in pairs with a stride of 4. In the fourth and final step, the results of the stride=4 additions are added in pairs with a stride of 8. Note that each value resulting from the stride=8 additions is the row sum of the corresponding pixel location in the set of original values. Further note that each stride after the initial stride is a power of 2 of the previous stride.

FIG. 20 is a block diagram of an example II accelerator 2000 which can be used as the II accelerator 312 of FIG. 3. The example II accelerator 2000 includes functionality to compute the integral image values for multiple consecutive rows, i.e., a row block, in an image. The II accelerator 2000 includes multiple row computation components 2002-2006, a block integral image computation component 2008, and a block pivot buffer 2010. Multiple invocations of the II accelerator 2000 can be performed to generate an integral image for an entire image.

The row computation components 2002-2006 are configured to operate in parallel to compute the row sums values of a row block of an image. Each row computation component 2002-2006 is configurable to compute the row sum values of one row of the row block. The number of row computation components 2002-2006 and the maximum input row size for each row computation component is implementation dependent and may be determined, for example, based on criteria such as the desired computation speed, power consumption, and chip silicon area budget. For example, in some embodiments, there are sixteen row computation components, each of which can accept a maximum input row size of 4096 pixels. Further, in some embodiments, the input row size of each row computation component 2002-2006 is configurable and can be less than the maximum input row size. In some embodiments, the number of row computation components 2002-2006 to be used for computing the integral image of a row block is also configurable and can be less than the total number of row computation components. Operation of a row computation component 2002-2006 is explained in more detail in reference to FIG. 22.

The block integral image computation component 2008 includes functionality to receive the row sum values for the row block from the row computation components 2002-2006 and to compute the integral image values for the row block using the row sum values and the block pivots from the previous row block, if any. Block pivots are previously described herein in reference to the example of FIGS. 5-18. The block pivot buffer 2010 stores the block pivots from the previous row block. To compute the integral image values, the block integral image computation component 2008 includes functionality to perform vertical additions in each column of the row sum values of the row block using the block pivot of the corresponding column as previously described herein in reference to the example of FIGS. 5-18. Note that the number of vertical additions in each column depends on the number of rows in the input row block. In some embodiments, the vertical additions are implemented as a network of adders.

The block integral image computation component 2008 is further configured to output the integral image values for the input row block, which are stored in external memory, e.g., RAM 318 of FIG. 3, and to store the bottom row of integral image values in the block pivot buffer 2010 to be used as block pivots for the next input row block.

FIG. 21 is a block diagram of an example II accelerator 2100 which can be used as the II accelerator 312 of FIG. 3. The example II accelerator 2100 includes functionality to compute the integral image values for multiple consecutive rows, i.e., a row block, in an image. The II accelerator 2100 includes multiple row computation components 2102-2106 and a block pivot buffer 2110. Multiple invocations of the II accelerator 2100 can be performed to generate an integral image for an entire image.

The row computation components 2102-2106 are configured to operate in parallel to compute the row sums values of a row block of an image. Each row computation component 2102-2106 is configurable to compute the row sum values of one row of the row block. The number of row computation components 2102-2106 and the maximum input row size for each row computation component is implementation dependent and may be determined, for example, based on criteria such as the desired computation speed, power consumption, and chip silicon area budget. For example, in some embodiments, there are sixteen row computation components, each of which can accept a maximum input row size of 4096 pixels. Further, in some embodiments, the input row size of each row computation component 2102-2106 is configurable and can be less than the maximum input row size. In some embodiments, the number of row computation components 2102-2106 to be used for computing the integral image of a row block is also configurable and can be less than the total number of row computation components. Operation of a row computation component 2102-2106 is explained in more detail in reference to FIG. 22.

The DSP 304 (FIG. 3) is coupled to the II accelerator 2100 to receive the row sum values for the row block from the row computation components 2102-2106 and includes functionality to compute the integral image values for the row block using the row sum values and the block pivots from the previous row block, if any. Block pivots are previously described herein in reference to the example of FIGS. 5-18. To compute the integral image values, the DSP 304 includes functionality to perform vertical additions in each column of the row sum values of the row block using the block pivot of the corresponding column as previously described herein in reference to the example of FIGS. 5-18. Note that the number of vertical additions in each column depends on the number of rows in the input row block.

The DSP 304 is further configured to output the integral image values for the input row block, which are stored in external memory, e.g., RAM 318 of FIG. 3, and to store the bottom row of integral image values in a memory accessible by the DSP 304 to be used as block pivots for the next input row block.

FIG. 22 is a block diagram of an example row computation component 2200 such as the row computation components 2002-2006 in the II accelerator 312 of FIG. 20 and the row computation components 2102-2106 in the II accelerator 312 of FIG. 21. The row computation component 2200 includes functionality to compute the row sum values of a sequence of pixels, e.g., a row of pixels from an image. The example row computation component 2200 includes a row data router 2202, multiple pixel processing components 2204-2210, multiple segment row sum computation components 2214-2220, a row pivots computation component 2222, a row sum computation component 2224, and a configuration component 2212.

The input data router 2202 includes functionality to receive a sequence of pixel values from an image, e.g., a row of pixels values, and to route a configurable number of segments of sequential pixels to respective pixel processing components 2204-2210. Each pixel processing component 2204-2210 includes functionality to receive a segment of sequential pixel values from the input data router 2202 and perform any processing needed to prepare the pixel values for the computations performed by the respective segment row sum computation component 2214-2220. For example, in some embodiments, if the input pixel values are 8-bit or 12-bit values, the pixel processing components 2204-2210 make the values 16-bit aligned.

Each segment row sum computation component 2214-2220 includes functionality to compute the row sum values of the segment of pixel values received from the respective pixel processing component 2204-2210. The output of each segment row sum computation component 2214-2220 is a segment of row sum values corresponding to the input segment of pixel values. For example, assume there are three segment row sum computation components SRSC1, SRSC2, and SRSC3. Further, assume the input segment for SRSC1 is [1 2 3 4], the input segment for SRSC2 is [5 6 7 8], and the input segment for SRSC 3 is [9 10 11 12]. The output segment of SRSC1 is [1 3 6 10], the output segment of SRSC2 is [5 11 18 26], and the output segment of SRSC3 is [9 19 30 42]. Also see the example of FIGS. 5-18 regarding determining row sum values for row segments.

Figure 19:
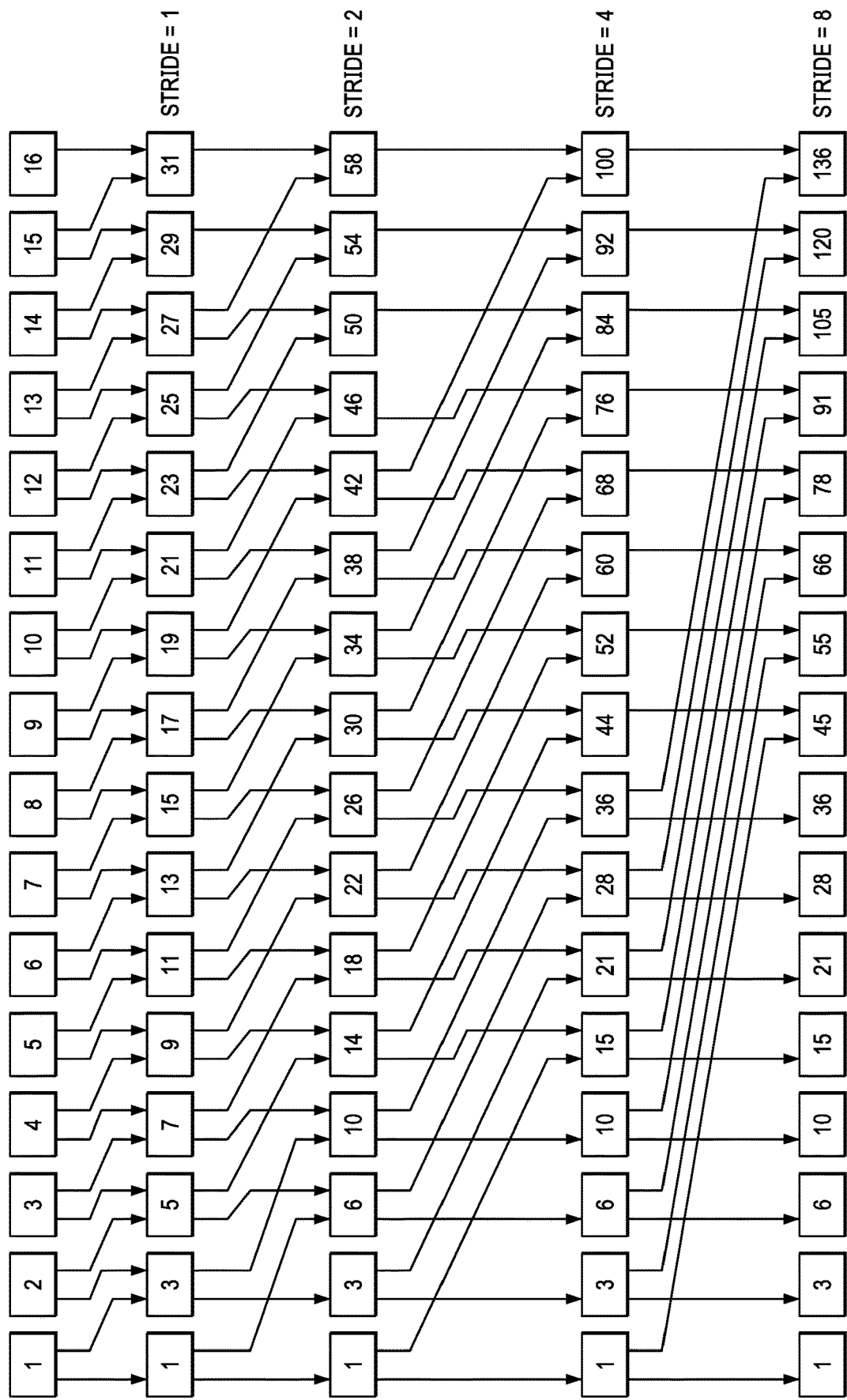
FIG. 19 is an example illustrating row sum computation of N values in $\log_2 N$ steps.

In some embodiments, the segment row sum computation components 2214-2220 include functionality to perform the segment row sum computations in $\log_2 N$ steps of parallel additions as described in reference to the example of FIG. 19. In such embodiments, N is the number of pixel values in the input segment received from the respective pixel processing component 2204-2210.

The number of pixel processing components and segment row sum computation components included in a row computation component is implementation dependent. Further, the maximum number of pixel values that can be processed by these components is also implementation dependent. In some embodiments, the maximum expected row width of an input image and implementation complexity are factors considered in determining the number of pixel processing components and segment row sum computation components and the maximum number of pixel values each component can process. In some embodiments, the expected maximum row width is 4096 pixels and a row computation component includes sixteen pixel processing components and sixteen segment row sum components, each of which is configured to accept a maximum of 256 pixels as input.

The row pivots computation component 2222 includes functionality to compute the row pivots needed for computing the row sum values for the entire input row. To compute the row pivots, the row pivots computation component 2222 receives the last or rightmost row sum value from each enabled row sum computation component 2214-2220. The row pivots computation component 222 uses the received row sum values to compute a row pivot for each segment of row sum values. The row pivots can be computed recursively as per row_pivot(N)=pivot_data(N)+row_pivot(N−1) where N is the Nth row segment and pivot_data is the last or rightmost row sum value of the Nth row segment. Continuing the above example, the pivot values from the row sum segments are 10, 26, and 42 and the computed row pivots are 10, 36, and 78. Also see the example of FIGS. 5-18 regarding determining row pivots.

Note that the computation of the row pivots using the pivot values is similar to the row sum computation for each row segment. In some embodiments, the row pivots computation component 2222 includes functionality to perform the row pivot computations in $\log_2 N$ steps of parallel additions as described in reference to the example of FIG. 19 where N is the number of row segments if the number of row segments is a power of 2 and N is the closest power of 2 greater than the number of row segments otherwise.

The row sum computation component 2224 includes functionality to compute the row sum values for the input row using the row sum segments from the segment row sum computation components 2214-2220 and the row pivots from the row pivots computation component 2222. More specifically, the row sum computation component 2224 includes functionality to add row pivots to row sum values in respective row sum segments to generate the row sum values for the entire input row. Continuing the previous example, the row integral image computation component 2126 adds the row pivot 10 to the row sum segment [5 11 18 26] and the row pivot 36 to the row sum segment [9 19 30 42]. The resulting row sums for the entire row are [1 3 6 10 15 21 28 36 45 55 66 78]. Also see the example of FIGS. 5-18 regarding determining row sum values for an entire row using row pivots.

The configuration component 2212 receives and stores configuration parameters for the row computation component 2200. The configuration parameters may include, for example, the number of pixels in a row of the input image, the number of bits in a pixel, and the number of pixels in each row segment.

Figure 23:
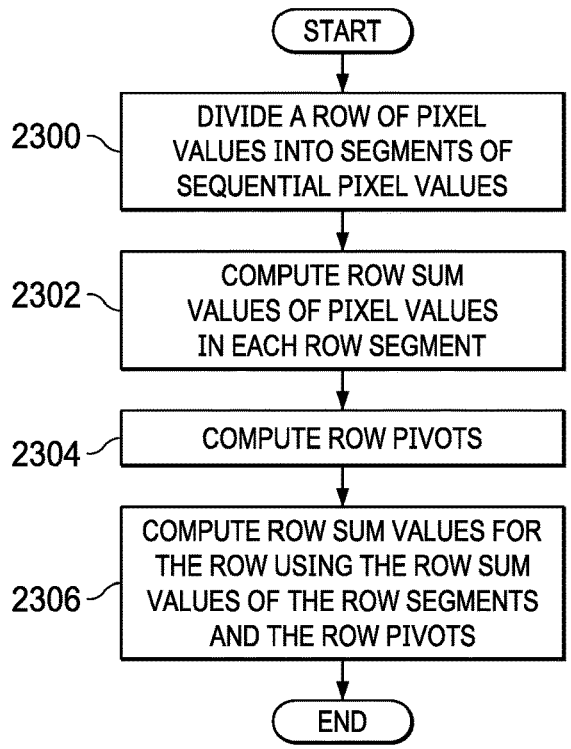
FIG. 23 is a flow diagram of a method for computing row sum values for a row of pixel values of an image.

FIG. 23 is a flow diagram of a method for computing row sum values for a row of pixels values of an input image that can be performed, for example, by a row computation component 2200. Initially, the row of pixel values is divided 2300 into segments of sequential pixel values, e.g., by the row data router 2202. The row sums of the pixel values in each row segment are then computed 2302 in parallel, e.g., in respective segment row computation components 2214-2220. In some embodiments, the segment row sum computations are performed in $\log_2 N$ steps of parallel additions as described herein.

Next, the row pivots are computed 2304, e.g., in the row pivots computation component 2222. As previously described herein, the last or rightmost row sum value of each segment is used to determine the row pivots for the segments. In some embodiments, the row pivot computations are performed in $\log_2 N$ steps of parallel additions as described herein.

The row sum values for the row are then computed 2306, e.g., in the row sum computation component 2224, using the row sum values of the segments and the row pivots. As previously described, the row sum values for the row are computed by adding row pivots to the row sum values of respective row segments.

Figure 24:
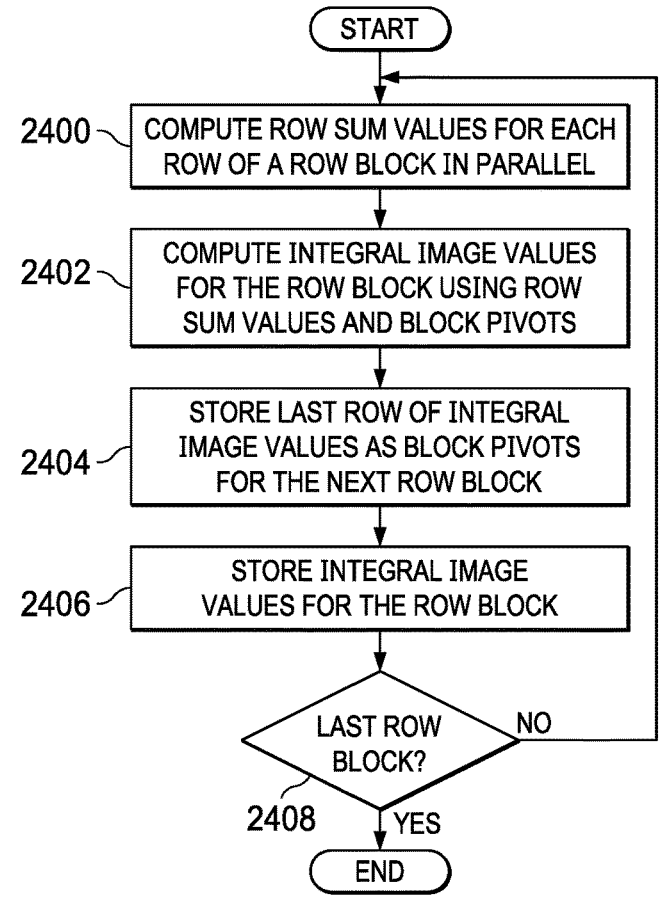
FIG. 24 is a flow diagram of a method for computing an integral image.

FIG. 24 is a flow diagram of a method for computing an integral image that can be performed, for example, using the II accelerator 312. Initially, the row sum values for each row of a row block of the image are computed 2400 in parallel, e.g., in respective row computation components 2102-2106. The integral image values for the row block are then computed 2402 using the row sum values for each row and block pivots from computation of the integral image values for the previous row block. Note that for the initial row block of the image, there will be no block pivots. As previously described herein, to compute the integral image values, vertical additions are performed in each column of the row sum values of the row block using the block pivot of the corresponding column. The computation of the integral image values may be performed, for example, by the block integral image computation component 2008 or by the DSP 304.

The last row of the integral image values is stored 2404 as block pivots for the next row block and the integral image values for the row block are also stored 2406, e.g., in RAM 318. The block pivots may be stored, for example, in the block pivot buffer 2010 if the block integral image computation component 2008 performs the computation of the integral image values or in a memory accessible by the DSP 304 if the DSP 304 performs the computation of the integral image values. The method is then repeated for the next row block, if any 2408.

Other Embodiments

While the disclosure has been described with respect to a limited number of examples, those having benefit of this disclosure will appreciate that other examples can be devised which do not depart from the scope of the disclosure as described herein.

For example, embodiments of an II accelerator are described herein with multiple row computation components that compute the row sums of respective rows of a row block in parallel. In some embodiments, an II accelerator can include only a single row computation component. In such embodiments, rather than computing integral image values for row blocks, integral image values are computed one row at a time, and the integral image values for a row serve as block pivots for the next row in the image.

In another example, embodiments of an SoC are described herein with a single II accelerator. In some embodiments, an SoC can include two or more II accelerators and the II accelerators can be used to compute integral image values for respective row blocks of an image or for concurrent computation of integral image values of separate images, e.g., separate levels of an image pyramid or images from separate cameras.

It is therefore contemplated that the appended claims will cover any such modifications of the examples as fall within the true scope of the disclosure.

What is claimed is:

1. A video component comprising:
a router configured to:
receive a row of pixel values; and
divide the row of pixel values into a first segment and a second segment;
a first segment row sum computation component configured to receive the first segment and output a first set of row sum segment values associated with the first segment;
a second segment row sum computation component configured to receive the second segment and output a second set of row sum segment values associated with the second segment;
a row pivot computation component coupled to the first segment row sum computation component and the second segment row sum computation component, the row pivot computation component configured to determine a first segment row pivot based on the first set of row sum segment values and a second segment row pivot based on the second set of row sum segment values;
a row sum computation component coupled to the row pivot computation component, the first segment row sum computation component, and the second segment row sum computation component, wherein the row sum computation component is configured to determine a set of row sum values associated with the row of pixel values, the set of row sum values based on the first set of row sum segment values, the second set of row sum segment values, the first segment row pivot, and the second segment row pivot.

2. The video component of claim 1, further comprising:
a first pixel processing component configured to receive the first segment from the router and align the first segment; and
a second pixel processing component configured to receive the second segment from the router and align the second segment.

3. The video component of claim 2, wherein:
the first pixel processing component performs a first 16-bit alignment on the first segment; and
the second pixel processing component performs a second 16-bit alignment on the second segment.

4. The video component of claim 1, further comprising:
a configuration component.

5. The video component of claim 4, wherein:
the configuration component is configured to receive and store configuration parameters associated with the video component.

6. The video component of claim 5, wherein:
the configuration parameters include a number of pixels the row of pixel values; a number of bits in a pixel, a number of pixels in the first segment, and a number of pixels in the second segment.

7. The video component of claim 5, wherein:
the router divides the row of pixel values based on the configuration parameters.

8. The video component of claim 1, wherein:
the first segment row sum computation component and the second segment row sum computation component operate in parallel to output the first set of row sum segment values and the second set of row sum segment values, respectively.

9. The video component of claim 1, wherein:
the row of pixel values is a sequential row of pixel values.

10. The video component of claim 1, wherein:
the first segment row pivot is a first last row sum value of the first segment; and
the second segment row pivot is determined by adding a second last row sum value of the second segment with the first segment row pivot.

11. A method comprising:
receiving, by a router, a row of pixel values;
dividing, by the router, the row of pixel values into a first segment and a second segment;
receiving, by a first segment row sum computation component, the first segment;
outputting, by the first segment row sum computation component, a first set of row sum segment values associated with the first segment;
receiving, by a second segment row sum computation component, the second segment;
outputting, by the second segment row sum computation component, a second set of row sum segment values associated with the second segment;

determining, by a row pivot computation component, a first segment row pivot based on the first set of row sum segment values;

determining, by the row pivot computation component, a second segment row pivot based on the second set of row sum segment values; and determining, by a row sum computation component, a set of row sum values associated with the row of pixel values, the set of row sum values based on the first set of row sum segment values, the second set of row sum segment values, the first segment row pivot, and the second segment row pivot.

12. The method of claim 11, further comprising:

receiving, by a first pixel processing component, the first segment from the router;

aligning, by the first pixel processing component, the first segment;

receiving, by a second pixel processing component, the second segment from the router;

aligning, by the second pixel processing component, the second segment.

13. The method of claim 12, wherein:

the first pixel processing component performs a first 16-bit alignment on the first segment; and the second pixel processing component performs a second 16-bit alignment on the second segment.

14. The method of claim 13, wherein:

the first segment and the second segment include 12-bit values prior to alignment.

15. The method of claim 11, further comprising:

receiving, by a configuration component, configuration parameters associated with a video component; and storing, by the configuration component the configuration parameters.

16. The method of claim 15, wherein:

the configuration parameters include a number of pixels the row of pixel values; a number of bits in a pixel, a number of pixels in the first segment, and a number of pixels in the second segment.

17. The method of claim 15, wherein:

the router divides the row of pixel values based on the configuration parameters.

18. The method of claim 11, wherein:

the first segment row sum computation component and the second segment row sum computation component operate in parallel to output the first set of row sum segment values and the second set of row sum segment values, respectively.

19. The method of claim 11, wherein:

the row of pixel values is a sequential row of pixel values.

20. The method of claim 11, wherein:

the first segment row pivot is a first last row sum value of the first segment; and the second segment row pivot is determined by adding a second last row sum value of the second segment with the first segment row pivot.

* * * * *